United States Patent
Fuehrer

(10) Patent No.: US 12,269,356 B2
(45) Date of Patent: Apr. 8, 2025

(54) PLUG CONNECTOR

(71) Applicant: PHOENIX CONTACT E-Mobility GmbH, Schieder-Schwalenberg (DE)

(72) Inventor: Thomas Fuehrer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 636 days.

(21) Appl. No.: 17/632,796

(22) PCT Filed: Aug. 19, 2020

(86) PCT No.: PCT/EP2020/073149
§ 371 (c)(1),
(2) Date: Feb. 4, 2022

(87) PCT Pub. No.: WO2021/043571
PCT Pub. Date: Mar. 11, 2021

(65) Prior Publication Data
US 2022/0289049 A1 Sep. 15, 2022

(30) Foreign Application Priority Data

Sep. 2, 2019 (DE) .................. 10 2019 123 425.5

(51) Int. Cl.
*B60L 53/16* (2019.01)
*B60L 53/18* (2019.01)
*H01R 13/52* (2006.01)

(52) U.S. Cl.
CPC .............. *B60L 53/16* (2019.02); *B60L 53/18* (2019.02); *H01R 13/5205* (2013.01); *H01R 13/5213* (2013.01); *H01R 2201/26* (2013.01)

(58) Field of Classification Search
CPC .......... B60L 53/16; B60L 53/18; B60L 53/34; H01R 13/5205; H01R 13/5213;
(Continued)

(56) References Cited

U.S. PATENT DOCUMENTS

| 4,214,802 A | 7/1980 | Kato et al. |
| 5,098,310 A * | 3/1992 | Avramovich ...... H01R 13/5219 439/282 |

(Continued)

FOREIGN PATENT DOCUMENTS

| CN | 108482278 A | 9/2018 |
| CN | 209071709 U | 7/2019 |

(Continued)

OTHER PUBLICATIONS

Dongguan Nissei Transmitting Tech Co Inc, CN209071709U_Description translation, obtained Oct. 22, 2024 from Espace.net, pp. 1-5., Jul. 5, 2019 (Year: 2019).*

*Primary Examiner* — Stacy Whitmore
(74) *Attorney, Agent, or Firm* — LEYDIG, VOIT & MAYER, LTD.

(57) ABSTRACT

A plug connector for charging an electric vehicle includes: a housing, which delimits a housing interior chamber; a cable, which is led through an opening in the housing into the housing interior chamber; and a seal, which seals the housing interior chamber between the cable and the housing. The seal has a sealing lip enclosing the cable and contacting the cable. The seal has a sealing ridge enclosing the cable and contacting the housing.

9 Claims, 6 Drawing Sheets

(58) Field of Classification Search
CPC . H01R 2201/26; Y02T 10/70; Y02T 10/7072; Y02T 90/14
See application file for complete search history.

(56) References Cited

U.S. PATENT DOCUMENTS

| | | | |
|---|---|---|---|
| 5,451,717 | A | 9/1995 | Itou |
| 5,540,450 | A | 7/1996 | Hayashi et al. |
| 5,892,175 | A * | 4/1999 | Enos ................ H02G 3/088 174/652 |
| 6,053,753 | A * | 4/2000 | Kunkle ............ H01R 13/5221 439/275 |
| 7,883,365 | B2 * | 2/2011 | Saitou ............. H01R 13/5205 439/587 |
| 2012/0058659 | A1 | 3/2012 | Mehnert |

FOREIGN PATENT DOCUMENTS

| | | |
|---|---|---|
| DE | 2900915 A1 | 8/1979 |
| DE | 2835832 A1 | 3/1980 |
| DE | 69321808 T2 | 7/1999 |
| DE | 69417977 T2 | 8/1999 |
| DE | 202006019791 U1 | 3/2007 |
| DE | 102009003016 A1 | 11/2010 |
| EP | 1883135 A1 | 1/2008 |
| EP | 2112721 A1 | 10/2009 |
| KR | 2018020366 A | 2/2018 |
| WO | WO 1998037597 A1 | 8/1998 |

* cited by examiner

PLUG CONNECTOR

CROSS-REFERENCE TO PRIOR APPLICATIONS

This application is a U.S. National Phase application under 35 U.S.C. § 371 of International Application No. PCT/EP2020/073149, filed on Aug. 19, 2020, and claims benefit to German Patent Application No. DE 10 2019 123 425.5, filed on Sep. 2, 2019. The International Application was published in German on Mar. 11, 2021 as WO 2021/043571 under PCT Article 21(2).

FIELD

The invention relates to a plug connector for charging an electric vehicle.

BACKGROUND

In the field of electromobility, the highest demands in terms of stability and safety exist for plug connectors, which are also referred to as charging plug connectors.

A possible source of danger here is, for example, those assemblies that carry high voltages of up to 1000 volts and are subject to considerable weather and environmental influences. There is a risk, for example, that minor damage to the housing components and/or seals may result in leaks that allow liquid or moisture to enter the interior of the plug connector.

This moisture can cause various, primarily chemical effects and also, upon contact with live parts, electrochemical effects, which can significantly impair the electrical insulation. Accordingly, failure of the insulation in the charging plug connector can occur, for example through the formation of arcs. This can lead to a risk of the user of the plug connector or damage to the plug connector.

Plug connectors or charging plug connectors are frequently located on charging devices that are located outdoors. In the case of continuous sprinkling, the problem arises that both the charging cable and the connected charging plug connector are exposed to rainwater. As a rule, there is a suitable receptacle or parking position for the charging plug connector on a charging device, which provides protection for the plug connector when charging does not take place. If the charging plug connector is correctly arranged in the receptacle, the rainwater can run downward along the cable and drip off.

Practice shows that users often do not return the plug connector to its intended parking position but simply hang the cable over the charging device, for example. In this case, the charging plug hangs downward freely on the cable. The cable inlet of the plug connector housing, which is generally located on the underside of the plug, thus comes to lie upward and rainwater can flow along the cable directly onto the cable seal. Depending on the contour of the seal or of the housing, a more or less large volume of standing water can accumulate above the seal of the cable inlet and can possibly overcome the seal and penetrate into the housing. This can result in the aforementioned hazards and defects due to penetrating moisture.

For small and lightweight AC charging plug connectors, it is common to wind the charging cable onto a cable receptacle and leave the plug connector hanging freely. Here as well, water may collect in the region of the seal of the cable feedthrough as described above.

In the case of DC charging devices with heavy charging cables, there are again concepts that lead the charging cable upward out of the housing of the charging device, which can likewise lead to the above-described situation of the direct sprinkling of the seal and associated water accumulation for the cable feedthrough into the housing.

SUMMARY

In an embodiment, the present invention provides a plug connector for charging an electric vehicle, comprising: a housing, which delimits a housing interior chamber; a cable, which is led through an opening in the housing into the housing interior chamber; and a seal, which is configured to seal the housing interior chamber between the cable and the housing, wherein the seal has a sealing lip enclosing the cable and contacting the cable, and wherein the seal has a sealing ridge enclosing the cable and contacting the housing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
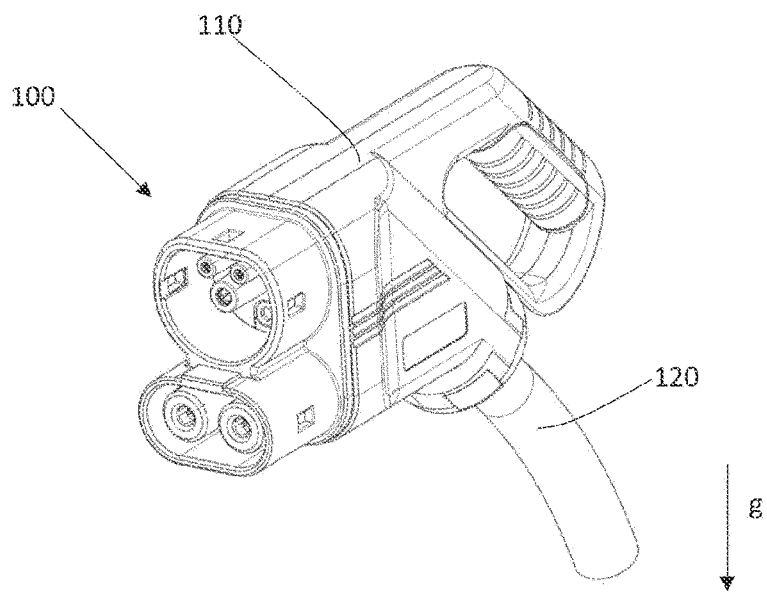
FIG. 1 shows a plug connector according to the invention in a perspective view from above in an upright position.

In an embodiment, the present invention provides a plug connector that, in the region of the cable feedthrough, enables improved tightness for any spatial orientation of the plug connector.

The invention relates to a plug connector for charging an electric vehicle, having a housing, which delimits a housing interior chamber, having a cable, which is led through an opening in the housing into the housing interior chamber, having a seal, which is arranged for sealing the housing interior chamber between the cable and the housing, wherein the seal has a sealing lip enclosing the cable and contacting the cable, and wherein the seal has a sealing ridge enclosing the cable and contacting the housing.

The sealing lip makes it possible to avoid or reduce the accumulation of water in the region of the seal so that rainwater can flow off for each orientation of the plug connector. In comparison to the sealing ridge, which seals against the housing, the sealing lip preferably has greater elasticity than the sealing ridge due to its shape, as a result of which the sealing lip can lay or fit particularly well against the cable in order to form a high degree of tightness. In particular, the sealing lip can have a wall thickness that is smaller than that of the sealing ridge so that the sealing lip can have a greater elasticity than the sealing ridge.

When a plug connector or charging plug connector is spoken of in the present case, it is, for example, a standardized charging plug connector in accordance with IEC 62196, SAE J1772, or GB/T 20234-2015.

The seal can be an elastomer seal. Accordingly, the seal is elastically deformable and lays without gaps against a relevant mating contour in order to close the housing interior chamber in a sealing manner.

The seal can be a sealing ring with a passage opening for the cable feedthrough so that the seal can be pushed onto the cable or the cable can be inserted through the passage opening of the seal.

The sealing lip can have a wall thickness of 1 cm or less. The sealing lip can have a wall thickness of 0.5 cm or less in an end section contacting the cable. It can be provided that the sealing lip is tapered in an end section contacting the cable; in particular, it has a wall thickness of 0.5 cm or less, in particular 0.3 cm or less. In this manner, the accumulation of water can be avoided particularly effectively.

In order to avoid the accumulation of water, it can further be provided that the sealing lip has a conical shape that promotes the outflow of water.

The seal can have a second sealing lip enclosing the cable and contacting the cable, in order to further improve the seal. It can be provided that the second sealing lip is tapered in an end section contacting the cable. Thus, the second sealing lip can also be configured to avoid the accumulation of water in a region of the sealing lip adjoining the cable.

The second sealing lip can have a wall thickness of 1 cm or less. The second sealing lip can have a wall thickness of 0.5 cm or less in an end section contacting the cable. It can be provided that the sealing lip is tapered in an end section contacting the cable; in particular, it has a wall thickness of 0.5 cm or less, in particular 0.3 cm or less. In this manner, the accumulation of water can be avoided particularly effectively.

The first and second sealing lips may be spaced apart from one another so that the first sealing lip forms a first moisture barrier or sealing point, and the second sealing lip forms a second moisture barrier or sealing point that is spaced apart therefrom.

In order to avoid the accumulation of water, it can be provided that the second sealing lip has a conical shape.

It can be provided that the sealing ridge has a sealing bead or a plurality of sealing beads.

Such a sealing bead can serve for the defined contact of the sealing ridge on an assigned housing wall.

A sealing bead can be formed annularly or circularly circumferentially and can contact an assigned circular cylindrical or conical housing surface or wall of the housing.

It can be provided that the first sealing ridge has two sealing beads spaced apart from one another. It can be provided that the first sealing ridge has three, four, or more sealing beads spaced apart from one another.

According to one embodiment of the plug connector, it can be provided that the sealing ridge contacts the cable. Thus, the region between the cable and the housing is sealed on the one hand by the sealing lip and on the other hand by the sealing ridge.

The first sealing ridge can have a sealing bead or a plurality of sealing beads that contact the cable. It can be provided that the first sealing ridge has two sealing beads that are spaced apart from one another and contact the cable. It can be provided that the first sealing ridge has three, four, or more sealing beads that are spaced apart from one another and contact the cable.

The first sealing ridge can have at least one sealing bead that contacts the cable, and can additionally have at least one sealing bead that contacts the housing.

It can be provided that the seal has a second sealing ridge, wherein the second sealing ridge can have a sealing bead or a plurality of sealing beads. Here as well, the sealing bead or the sealing beads serve to produce a defined contact of the seal on the housing in order to achieve a reliable seal.

When it is said that the sealing lip or the sealing ridge contacts the cable, this means that the sealing lip and the sealing ridge contact in particular an insulating sheathing of the cable, which encloses current-carrying cores or strands of the cable on the periphery.

The seal can have a recess in which a ridge of the housing engages.

In particular, it can be provided that the seal is held on the housing in a form-fitting manner. Thus, a defined position of the seal can be fixed relative to the housing.

Alternatively or additionally, it can be provided that the housing has a recess, into which a sealing ridge of the seal engages. Thus, the arrangement of the sealing ridge in a recess of the housing can ensure that a defined contact between the seal and the housing is formed. Furthermore, by means of the mutual engagement of the seal or the housing in assigned recesses, an additional number of sealing points can be realized in order to improve the sealing against the penetration of water.

It can be provided that the first sealing ridge and the second sealing ridge delimit the recess in which the ridge of the housing engages, wherein the first and the second sealing ridge each contact the ridge of the housing that engages in the recess of the seal.

In order to protect the seal from environmental influences, it can be provided that the plug connector has a protective cap that covers the seal, wherein the protective cap is connected to the housing. The protective cap can be placed over the seal in order to cover the seal.

It can be provided that the protective cap is latched with the housing by means of latching hooks in order to provide a simple and cost-effective detachable connection.

It can be provided that the protective cap is screwed to the housing or is detachably connected in some other manner. Alternatively, it can be provided that the protective cap is non-destructively detachably connected to the housing, for example glued, welded, or riveted.

It can be provided that the protective cap contacts the seal in a region or in a plurality of regions in order to reliably hold the seal in the intended position and to bring about a defined contact of the seal on the housing and the cable.

For example, it can be provided that shaped elements are formed on the seal and/or on the protective cap, such as knobs or the like, in order to achieve a defined contact between the seal and the protective cap. For example, it can be provided that the seal has knobs that are received in assigned receptacles of the protective cap.

The protective cap can comprise a plastic or consist of a plastic, wherein the protective cap can be formed as one unit or in one piece.

The seal can be formed as one unit or in one piece.

An outlet opening or a plurality of outlet openings for discharging liquids can be provided between the protective cap and the seal. Thus, water entering between the protective cap and the cable in the direction of the seal can be reliably drained in order to prevent the penetration of liquid into the housing of the plug connector.

The invention is explained in more detail below with reference to the accompanying drawings.

Figure 2:
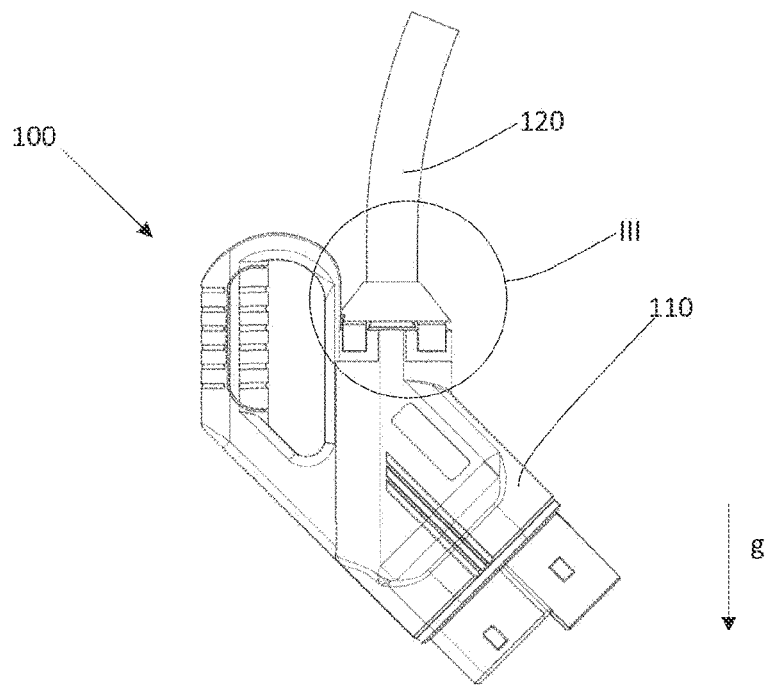
FIG. 2 shows the plug connector of FIG. 1 in a side view in a downward hanging position.

These show, in each case schematically:

FIG. 1 and FIG. 2 show a plug connector 100 for charging an electric vehicle, having a housing 110 and having a cable 120. The plug connector 100 is a standardized charging plug connector 110 in accordance with IEC 62196. In order to illustrate the spatial orientation of the plug connector 100 and its components for the individual representations, the gravitational acceleration g is shown in the figures in each case.

In FIG. 1, the plug connector 100 is located in its intended upright orientation, wherein the cable 120 is guided away downward, i.e., substantially in the direction of g. If the plug connector 100 is exposed to a sprinkling, the rainwater runs downward along the cable 120.

In the orientation of the plug connector 100 shown in FIG. 2, the housing 110 hangs downward on the cable 120. This happens, for example, if the plug connector is placed with its cable over a housing of a charging station instead of being inserted into a provided receptacle. To the extent that the plug connector 100 is exposed to a sprinkling in this position, the rainwater runs downward along the cable 120 in the direction of the plug connector housing 110.

Figure 3:
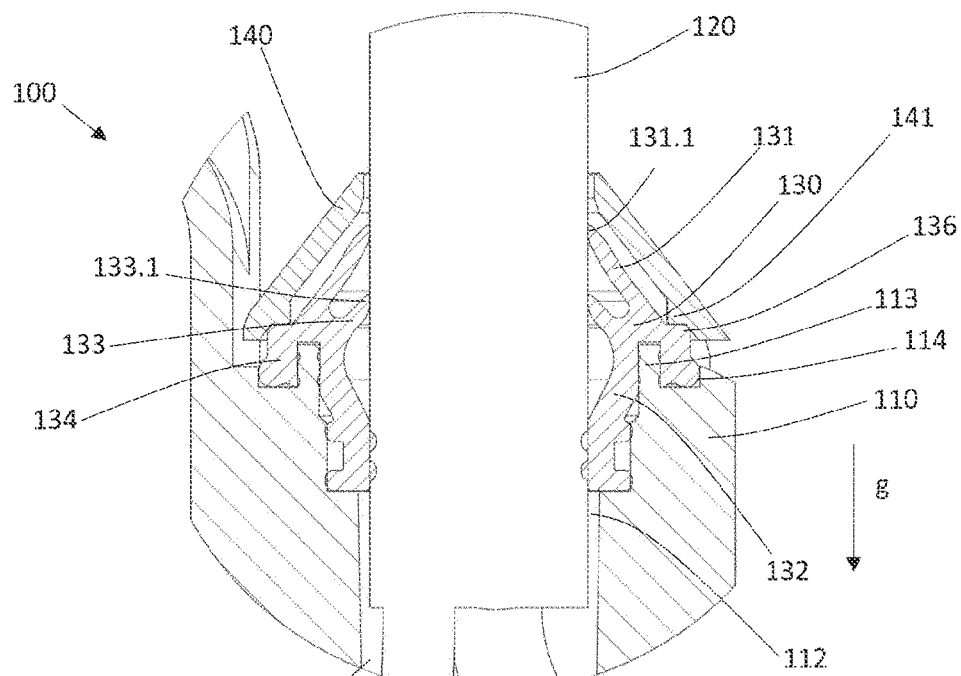
FIG. 3 shows a first cross-section of the detail III of FIG. 2.

FIG. 3 shows a first cross-section of a detail III according to FIG. 2.

The housing 110 delimits a housing interior chamber 111. The cable 120 is guided through an opening 112 of the housing 110 into the housing interior chamber 111.

The plug connector has a seal 130 that is arranged for sealing the housing interior chamber 111 between the cable 120 and the housing 110.

The seal 130 has a first sealing lip 131 enclosing the cable 120 and contacting the cable 120. The first sealing lip 131 is tapered in an end section 131.1 of the sealing lip 131 contacting the cable 120. Due to its narrow shape, the sealing lip 131 prevents the accumulation of water in the region of its end section 131.1 so that rainwater can flow off along the seal 130.

In the present case, a wall thickness d of the sealing lip 130 is less than 1 cm (FIG. 4), wherein the end section 131.1 is tapered to a wall thickness of less than 0.5 cm.

The seal 130 has a first sealing ridge 132 enclosing the cable 120 and contacting the housing 110.

The seal 130 has a second sealing lip 133 enclosing the cable 120 and contacting the cable 120, wherein the second sealing lip 133 is tapered in an end section 133.1 contacting the cable 120.

The sealing lips 131, 133 are each conically shaped.

Figure 4:
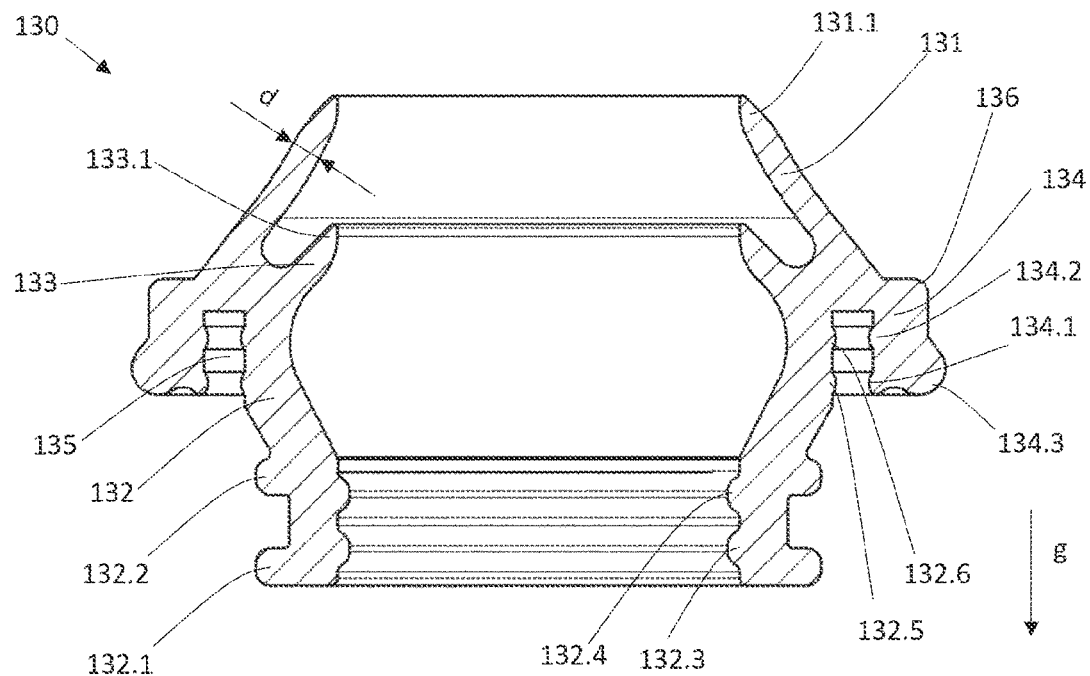
FIG. 4 shows a seal of the plug connector in a cross-section.

The first sealing ridge 132 has six annular or circular circumferential sealing beads 132.1, 132.2, 132.4, 132.5, 132.6 (FIG. 4).

The first sealing ridge 132 contacts the housing 110 with its sealing beads 132.1, 132.2, 132.5, and 132.6.

The first sealing ridge 132 contacts the cable 120 with its sealing beads 132.3 and 132.4.

The seal 130 has a second sealing ridge 134. The second sealing ridge 134 has three annular or circular circumferential sealing beads 134.1, 134.2, 134.3.

The seal 130 has a recess 135 (FIG. 4), into which a ridge 113 of the housing 110 engages (FIG. 3).

The housing 110 has a recess 114, into which the second sealing ridge 134 of the seal 130 engages.

The first sealing ridge 132 and the second sealing ridge 134 delimit the recess 135 and contact the ridge 113 of the housing 110.

The plug connector 100 has a protective cap 140 that covers the seal 130, wherein the protective cap 140 is connected to the housing 110. The protective cap 140 has a conical shape.

The protective cap 140 contacts the seal 130 in a plurality of regions. Thus, the protective cap 140 has shaped elements 141 that receive corresponding shaped elements 136 of the seal 130 in order to hold the seal 130 in position.

Figure 5:
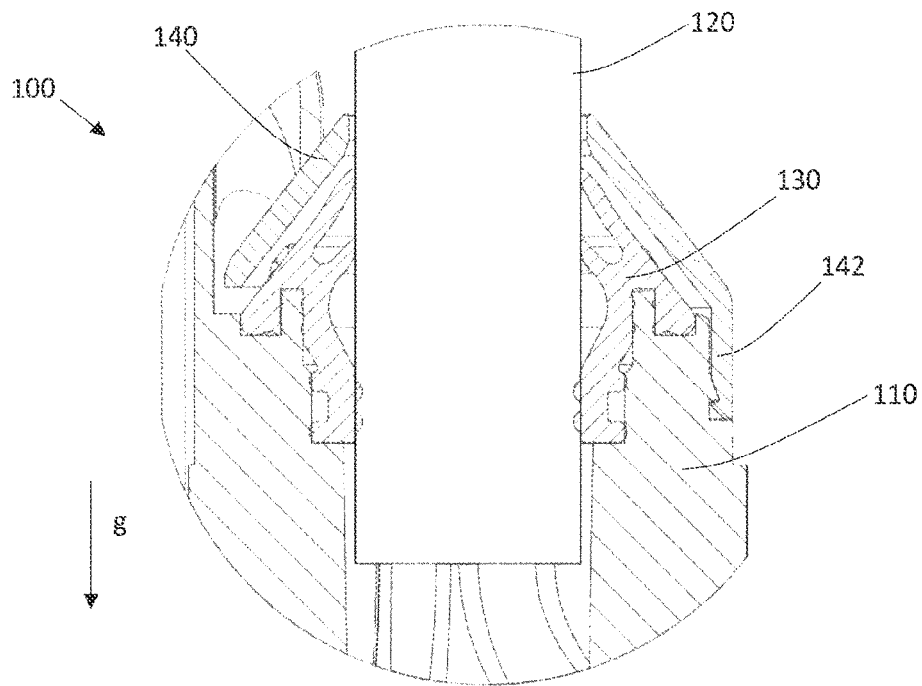
FIG. 5 shows a second cross-section of the detail III of FIG. 2.

FIG. 5 shows a second cross-section of a detail III according to FIG. 2, which extends through a latching hook 142 of the protective cap 140, with which the protective cap 140 is latched to the housing 110.

Figure 6:
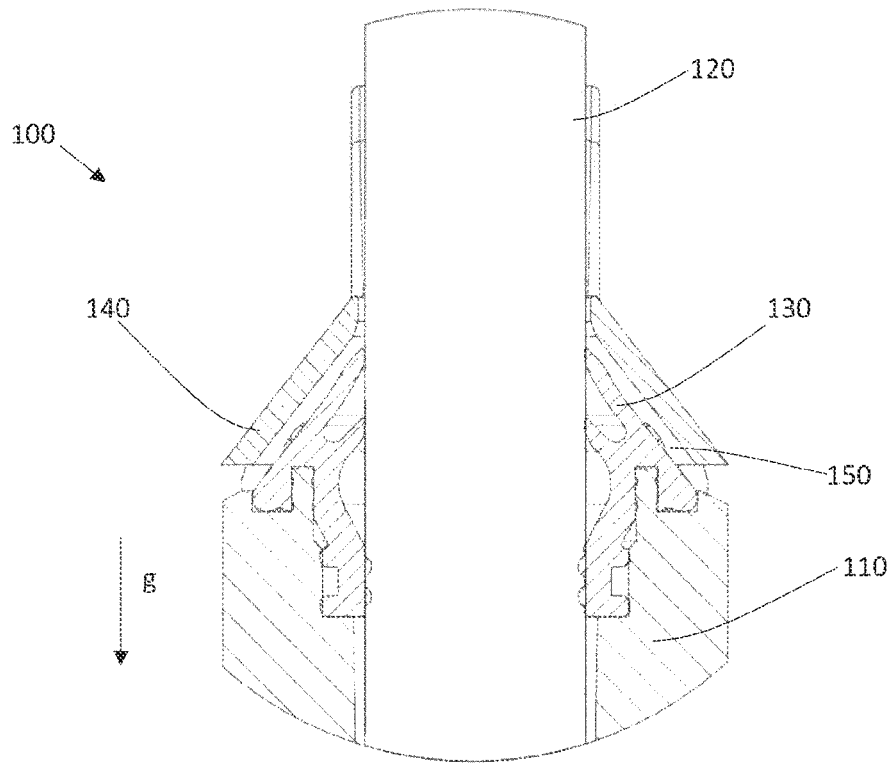
FIG. 6 shows a third cross-section of the detail III of FIG. 2.

FIG. 6 shows a third cross-section of a detail III according to FIG. 2, which extends at an offset from the latching hooks 142 and the shaped elements 141 of the protective cap 140. An outlet opening 150 or passage opening 150 is formed between the protective cap 140 and the seal 130, allowing water entering between the cable 120 and the protective cap 140 to flow off.

Figure 7A:
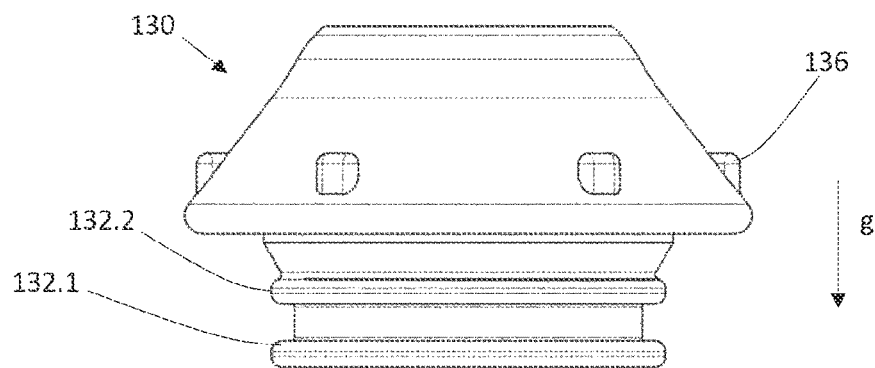
FIG. 7*a* shows the seal of FIG. 4 in a side view.
Figure 7B:
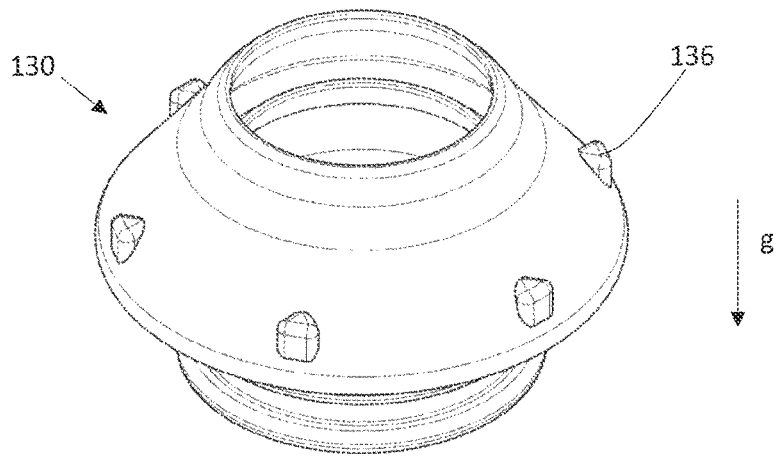
FIG. 7*b* shows the seal of FIG. 4 in a perspective view.
Figure 7C:
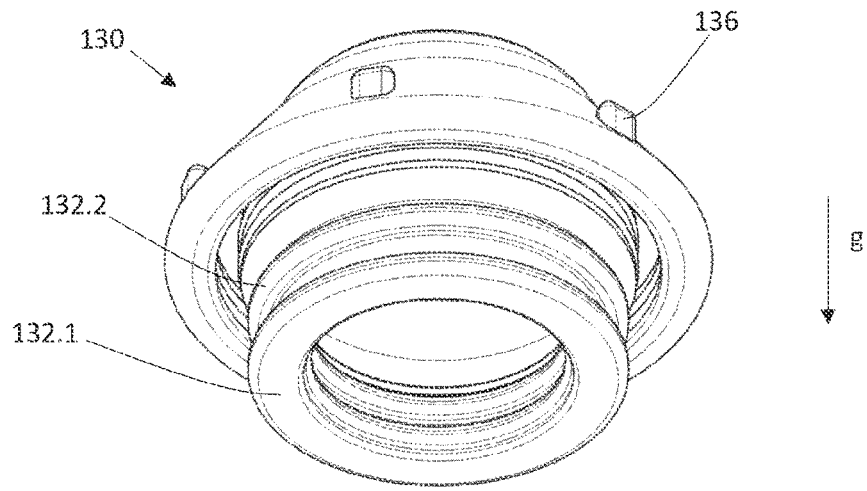
FIG. 7*c* shows the seal of FIG. 4 in a further perspective view.

FIGS. 7a, 7b, and 7c show the seal 130 in isolation, in a side view and in two perspective views. The seal 130 is designed here in the form of a sealing ring, which is formed from an elastomer. The shaped elements 136 are arranged in a manner distributed at equidistant angular distances, wherein the sealing ring 130 has a cyclically symmetrical shape.

Figure 8A:
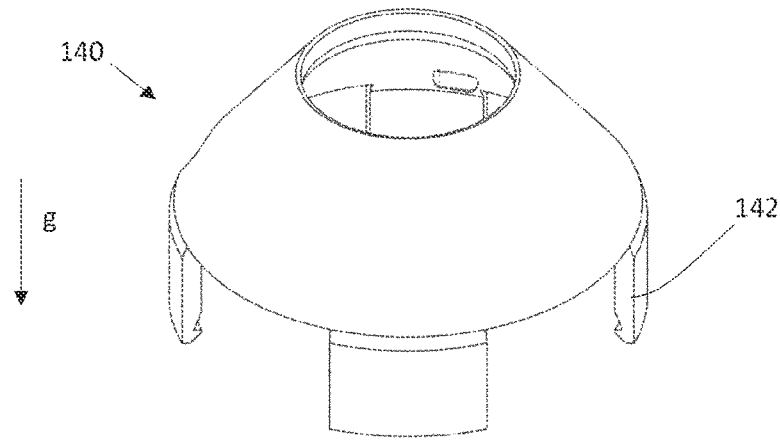
FIG. 8*a* shows a protective cap of the plug connector in a cross-section.
Figure 8B:
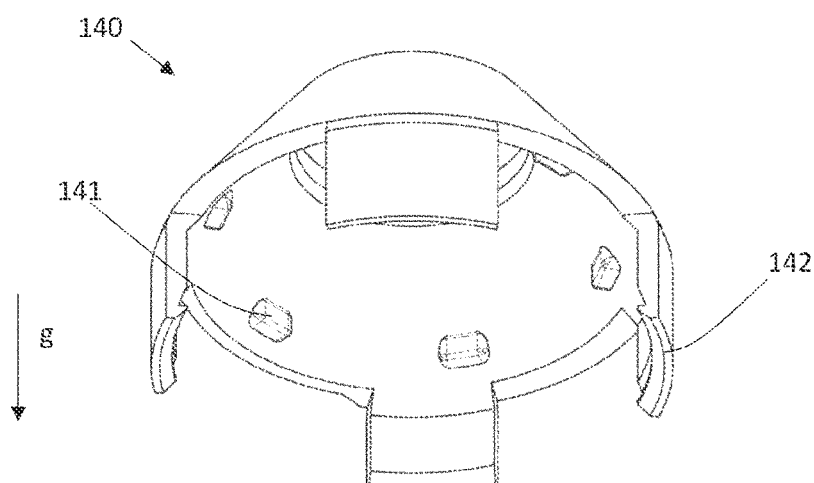
FIG. 8*b* shows the protective cap of FIG. 8*a* in a perspective view.
Figure 8C:
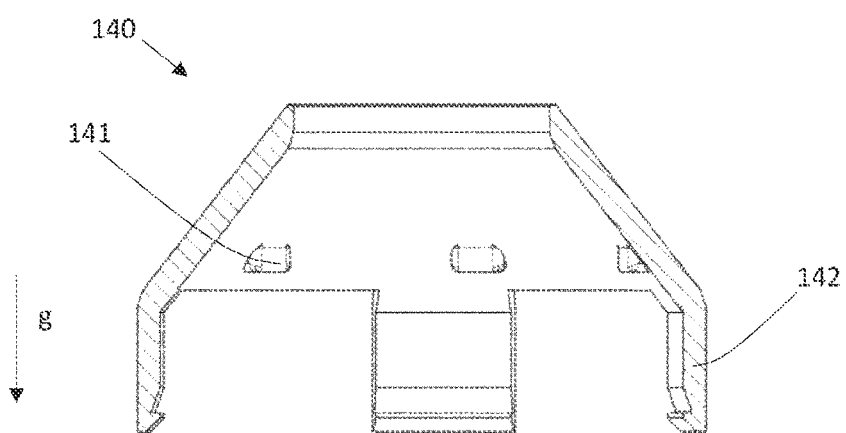
FIG. 8*c* shows the protective cap of FIG. 8*a* in a further perspective view.

FIGS. 8a, 8b, and 8c show the protective cap 140 in isolation, in two perspective views and a sectional view. The protective cap 140 consists of a plastic. The shaped elements 141 are arranged in a manner distributed at equidistant angular distances. The latching hooks 142 are arranged in a manner distributed at equidistant angular distances.

Figure 9:
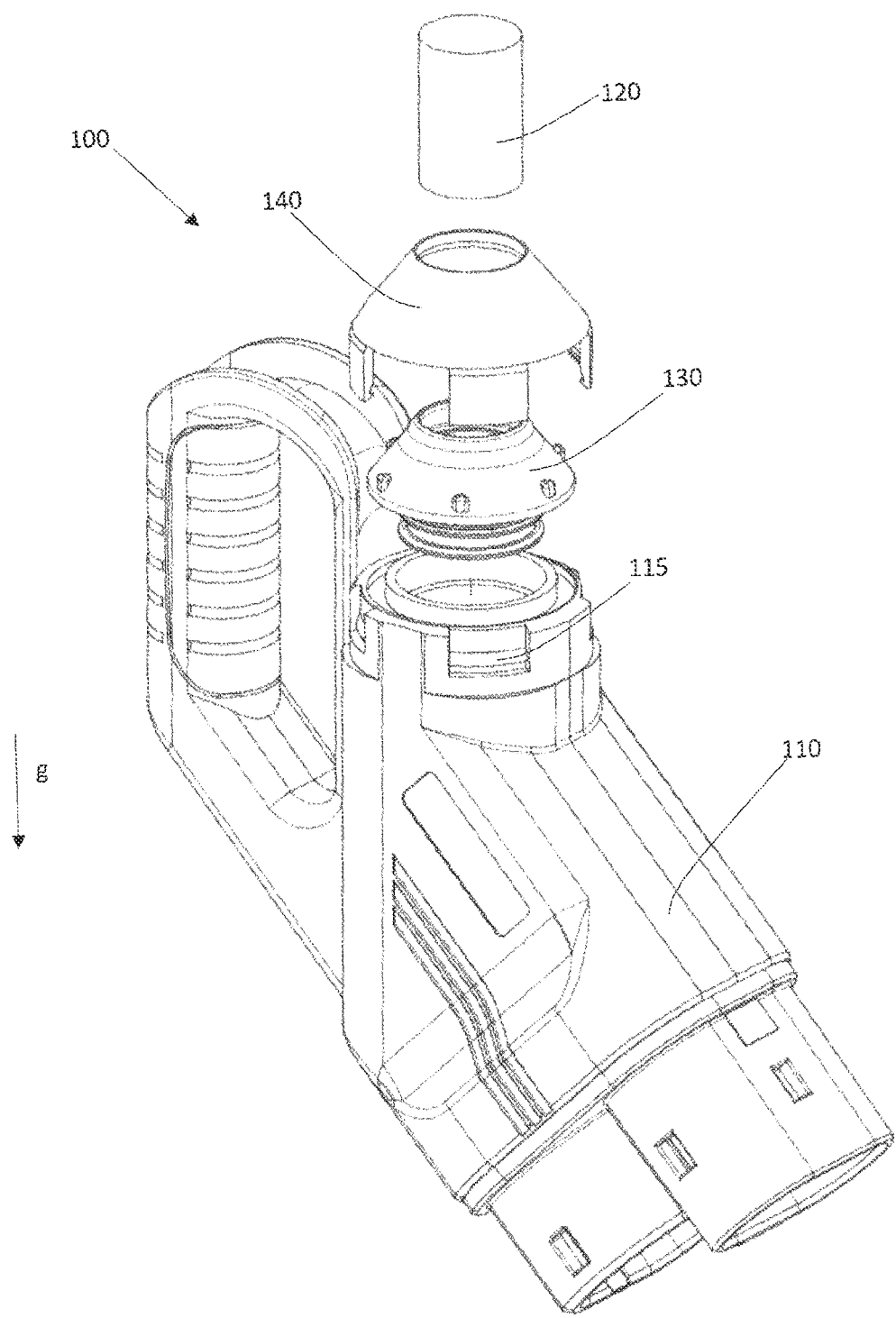
FIG. 9 shows the plug connector of FIG. 1 in a perspective view and in a downward hanging position with parts of the cable feedthrough in an exploded view.

FIG. 9 shows an exploded view of the components of the cable feedthrough of the plug connector 100, with the cable 120, the protective cap 140, and the seal 130. Latching grooves 115 are provided on the housing 110 and serve for receiving the latching hooks 142 of the protective cap 140.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Plug connector
110 Housing/plug connector housing
111 Interior chamber
112 Opening
113 Ridge
114 Recess
115 Latching groove
120 Cable
130 Seal
131 First sealing lip
131.1 Tapered end section
132 Sealing ridge
132.1 Bead
132.2 Bead
132.3 Bead
132.4 Bead
132.5 Bead
132.6 Bead
133 Second sealing lip
133.1 Tapered end section
134 Second sealing ridge
134.1 Bead
134.2 Bead
134.3 Bead
135 Recess
136 Shaped element/knobs
140 Protective cap
141 Shaped element
142 Latching hook
150 Outlet opening
d Wall thickness

The invention claimed is:

1. A plug connector for charging an electric vehicle, comprising:
   a housing, which delimits a housing interior chamber;
   a cable, which is led through an opening in the housing into the housing interior chamber; and
   a seal, which is configured to seal the housing interior chamber between the cable and the housing,
   a protective cap, which covers the seal and is connected to the housing,
   wherein the seal has a sealing lip enclosing the cable and contacting the cable,
   wherein the seal has a sealing ridge enclosing the cable and contacting the housing, and
   wherein one outlet opening or a plurality of outlet openings configured to discharge liquids is formed between the protective cap and the seal.

2. The plug connector of claim 1, wherein the sealing lip is tapered in an end section contacting the cable.

3. The plug connector of claim 1, wherein the seal has a second sealing lip enclosing the cable and contacting the cable, the second sealing lip being tapered in an end section contacting the cable.

4. The plug connector of claim 1, wherein the sealing ridge has a sealing bead or a plurality of sealing beads.

5. The plug connector of claim 1, wherein the sealing ridge contacts the cable.

6. The plug connector of claim 1, wherein the seal has a second sealing ridge, the second sealing ridge having a sealing bead or a plurality of sealing beads.

7. The plug connector of claim 6, wherein the seal has a recess, in which a ridge of the housing engages, and/or
   wherein the housing has a recess, in which a sealing ridge of the seal engages.

8. The plug connector of claim 7, wherein the sealing ridge and the second sealing ridge delimit the recess and contact the ridge of the housing.

9. The plug connector of claim 1, wherein the protective cap contacts the seal in one region or in a plurality of regions.

* * * * *